July 3, 1956 V. C. CETRONE 2,753,451

SWEEP VOLTAGE CONTROL APPARATUS

Filed Jan. 31, 1952 2 Sheets-Sheet 1

INVENTOR
VINCENT C. CETRONE
BY Paul B. Hunter
ATTORNEY

July 3, 1956 V. C. CETRONE 2,753,451

SWEEP VOLTAGE CONTROL APPARATUS

Filed Jan. 31, 1952 2 Sheets-Sheet 2

INVENTOR
VINCENT C. CETRONE
BY Paul B. Hunter
ATTORNEY 2,753,451
Patented July 3, 1956

2,753,451

SWEEP VOLTAGE CONTROL APPARATUS

Vincent C. Cetrone, Roslyn, N. Y., assignor to Sperry Rand Corporation, a corporation of Delaware Application January 31, 1952, Serial No. 269,301
12 Claims. (Cl. 250—27)

This invention relates to voltage control means and more particularly to means for stabilizing a cathode ray tube sweep voltage against variation due to change in frequency. More specifically the invention relates to means for stabilizing the sweep length of a cathode ray tube.

In an electrostatically deflected cathode ray tube the electron beam is horizontally swept at a uniform rate when a linear sawtooth voltage is applied to the horizontal deflection plates of the tube. The length of the sweep of the electron beam is directly proportional to the maximum amplitude of the sawtooth voltage applied. Consequently, if it is desirable to maintain a cathode ray tube display of fixed visual dimension horizontally, the electron beam must traverse the same fixed angle for each sweep. This can be accomplished by controlling the amplitude of the sawtooth voltage applied to the horizontal deflection plates so that it is constant.

This presents no great problem if the synchronizing input voltage to the sawtooth generator has a constant frequency. However, when a sawtooth voltage generator is employed which depends upon charging and discharging a fixed capacitance for shaping the sawtooth voltage waveform, a varying external synchronizing frequency will cause the maximum amplitude of the charge upon the capacitor to vary inversely as the frequency of its discharge. Since the sweep of the electron beam of the cathode ray tube and the dimension of the visual display on its face are directly correlated to and dependent upon the amplitude of the applied sawtooth voltage, the angle of sweep and length of visual display varies inversely with the frequency of the synchronizing input to the sawtooth voltage generator, if the capacitance of the charging condenser and the applied charging potential remains constant. Under these conditions the charging rate is constant and the maximum charge developed across the charging condenser varies inversely as the frequency of its discharge, there being less charging time in the cyclic period as the frequency increases. For instance, assuming that an 8 cycle per second synchronizing voltage produces a 3″ trace on a cathode ray tube, if the frequency of the voltage is increased to 24 cycles per second then the cathode ray trace will be reduced to approximately 1″ in length. This variation in the length of the cathode ray trace interferes with the proper reading of the cathode ray patterns, since it may be continually changing. In addition, at higher speeds the pattern is compressed unnecessarily so that only a portion of the cathode ray screen is used and useful information is lost. Therefore, it is desirable to stabilize the length of the trace, so that the pattern may be carefully observed and interpreted, and also in order that the pattern may be made as large as possible and utilize maximum space to present maximum information on the cathode ray screen.

The present invention provides a sawtooth generator of the capacitor-charging type in which the synchronizing input signal discharges the capacitor and the frequency of the synchronizing signal is used to develop a control voltage which changes the charging rate of the capacitor in direct proportion to the synchronization frequency. The amplitude of the sawtooth voltage developed across the charging capacitor is thus held constant over a varying range of frequencies because any change of charging period is compensated for by a corresponding change in charging rate of the capacitor.

The desired stabilization of the sawtooth amplitude is had by providing a feedback arrangement comprising an auxiliary charging circuit, a low pass filter circuit, a source of reference voltage, an error sensing circuit, and a control tube. The low pass filter circuit provides a direct current voltage which is proportional to the synchronizing frequency. The auxiliary charging circuit is triggered in synchronism with the main charging circuit. The output of the auxiliary charging circuit is filtered, compared to a reference voltage and the difference applied to a control tube which regulates the amplitude of the charging voltage and therefore the charging rate of both charging circuits. This arrangement compensates for changes in amplitude of the waveform produced by the principal circuit which would otherwise be caused by differences in the frequency of the input synchronizing pulses.

Therefore, the principal object of the present invention is to provide new and improved means for automatically stabilizing the length of a cathode ray trace.

Another object of the present invention is to provide new and improved means for automatically stabilizing the amplitude of a sawtooth voltage.

Another object of the present invention is to provide new and improved means for automatically varying the charging rate of a saw-tooth sweep voltage.

Another object of the present invention is to provide new and improved voltage regulating means.

Another object of the present invention is to provide new and improved means for stabilizing the length of the patterns of an engine analyzer.

Another object is to provide new and improved engine analyzer means.

Another object is to provide new and improved means for obtaining a cathode ray tube sweep speed proportional to the synchronizing frequency.

These and other objects of the present invention will be more apparent from the following specification and figures of which:

Figure 1 shows a block diagram of an embodiment of the invention. The upper portion comprises conventional sweep voltage generating circuits, and the lower portion comprises the sweep length control of the present invention.

Figure 1:
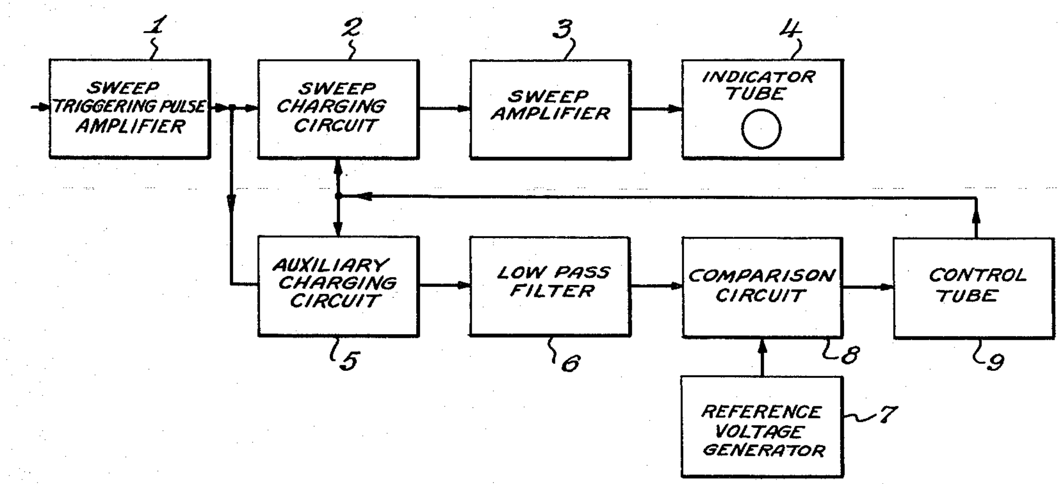
Fig. 1 is a block diagram of an embodiment of the invention.

The conventional portion of Figure 1 shows a source of triggering pulses 1 and a conventional sweep charging circuit 2, the output of which is connected to a sweep voltage amplifier 3. The output of the sweep voltage amplifier is connected to indicator oscilloscope 4.

The automatic sweep length control circuits comprise an auxiliary charging circuit 5 which is triggered by the pulse source 1 at the same time as the main charging circuit 2. The output of the auxiliary sweep circuit 5 is connected to a low pass filter circuit 6. The output of the filter circuit 6 is connected to a comparison circuit 8 to which is also connected a reference voltage from source 7. The output of the comparison circuit 8 is the difference between the two inputs and it is applied to the control tube 9, the output of which is connected to both charging circuits by a novel feedback arrangement.

Figure 2:
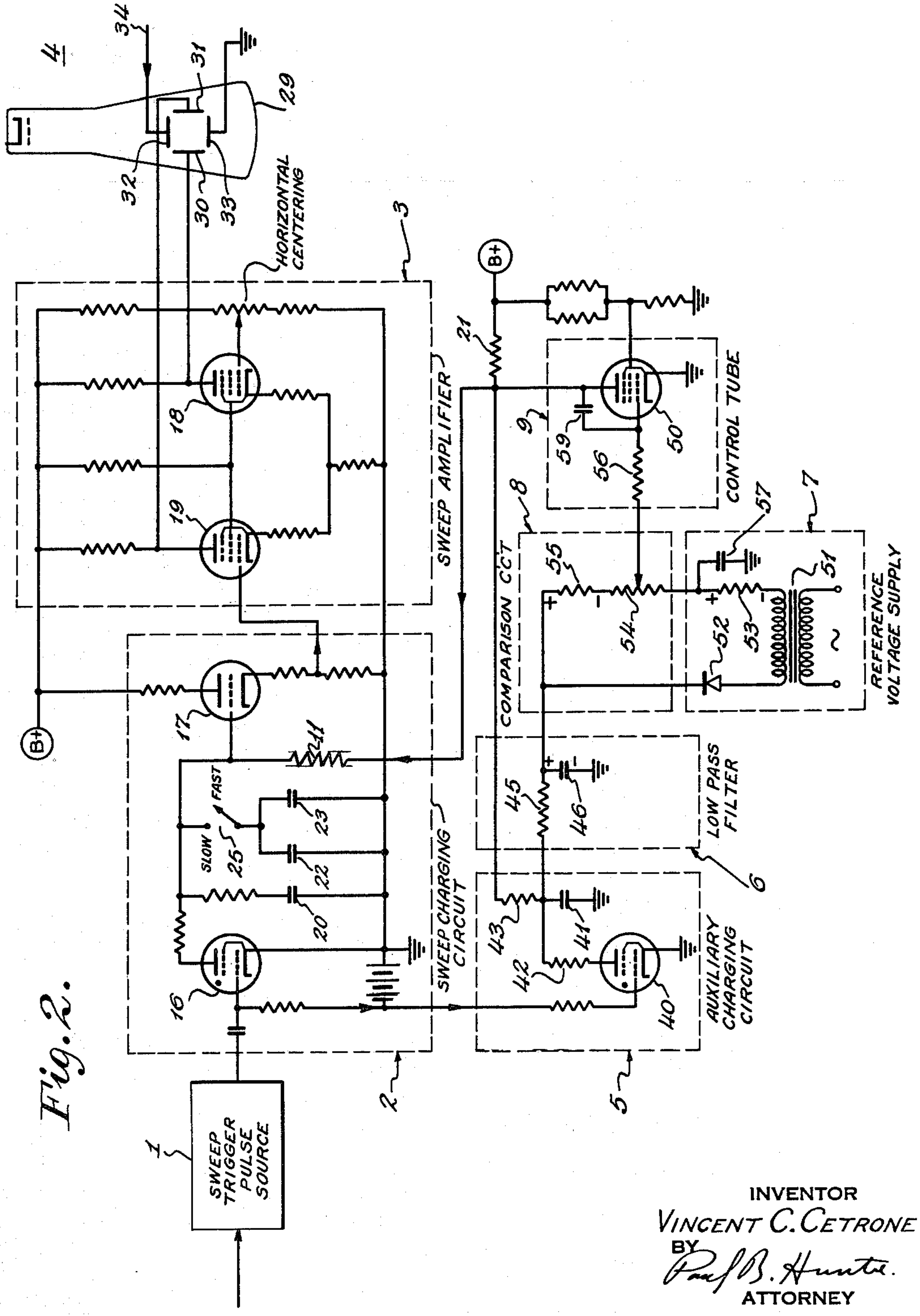
Fig. 2 is a schematic diagram of an embodiment of the invention.

It will be shown in connection with Figure 2 that the output of the control tube 9 will regulate the charging rate of both charging circuits in such a manner as to stabilize the sweep length on the cathode ray indicator scope 4.

Figure 2 shows a schematic diagram of the embodiment of Figure 1. The upper portion shows the conventional indicator sweep circuits, and the lower portion the automatic sweep length control of the present invention.

The conventional circuits comprise the trigger pulse source 1 which is externally driven and connected to and adapted to trigger the sweep charging circuit 2. The sweep amplifier 3 is connected to the charging circuit 2 for the purpose of amplifying the sweep voltage which is then applied to the indicator scope 4.

The sweep charging circuit 2 may comprise a condenser 20 which is charged through resistor 11 by the positive plate voltage of tube 50. The condenser 20 is adapted to be discharged through the thyratron gas discharge tube 16 when a positive trigger pulse is applied to the thyratron grid from the trigger pulse source 1. The speed of the sweep voltage is proportional to the time constant of the charging circuit. If a slower sweep voltage is required the additional capacitors 22 and 23 may be connected in parallel with the capacitor 20 by means of switch 25.

The sweep voltage is applied to the grid of cathode follower tube 17, the output of which is applied to the sweep amplifier comprising tubes 18 and 19. The amplifier sweep voltage is applied in push-pull fashion from the plates of amplifier tubes 18 and 19 to the horizontal deflection plates 30 and 31 of the cathode ray indicator 29. The signal which it is desired to examine is applied to the vertical deflection plates 32 and 33 by means of lead 34.

The arrangement illustrated by Fig. 2 is designed to operate with an electrostatically deflected cathode ray tube.

This invention can, however, be employed with an electromagnetically deflected cathode ray tube. The main sweep generating circuit 2 in the latter case would be altered so as to produce a trapezoidally shaped voltage waveform. The trapezoidal or peaked sawtooth shaped voltage waveform would in turn drive a horizontal deflection output tube connected to the horizontal deflection coils so as to cause a sawtooth current to flow therethrough.

One such alternate arrangement for use with an electromagnetically deflected cathode ray tube would require the connection of an additional resistor of appropriate value between each of the capacitors 20, 22, and 23 and ground to form the trapezoidal voltage waveform necessary to drive a sawtooth current through deflection coils. This is conventional cathode ray tube deflection technique and is merely illustrative of an alternate component circuit which may be embodied in the present invention.

It will be seen that the length of the trace on the face of the cathode ray tube will be generally inversely proportional to the frequency of the triggering pulses. For instance, a three to one change in frequency of the triggering pulses would have an inversely proportional effect on the length of the sweep trace. As pointed out above this is undesirable since it will change the horizontal length of the pattern, and also because the full available space of the cathode ray tube is not being utilized.

The remainder of the circuit of Figure 2 is adapted to provide the automatic sweep length control of the present invention. The automatic sweep length control circuit is provided by a feedback loop circuit, consisting generally of an auxiliary sweep voltage generator 5, low pass filter 6, reference voltage source 7, comparison circuit 8, and control tube 9. The feedback loop stabilizes the sawtooth amplitude in both the auxiliary and regular sweep voltage generators, by varying the charging rate in accordance with the repetition rate of the pulses received from the pulse source 1.

The auxiliary charging circuit comprises the thyratron tube 40, capacitor 41 and resistors 42 and 43. Both thyratrons 16 and 40 are biased beyond cutoff by a negative potential source such as that illustrated in the connection between the grids of tubes 16 and 40 and ground in Fig. 2. The charging voltages for both the auxiliary and regular sweep voltage generators is taken at the plate of the control pentode tube 50.

The sawtooth output voltage of the auxiliary sweep voltage generator is applied to the low pass filter circuit, comprising resistor 45 and capacitor 46. The useful output of the filter 6 is the direct current portion of its output. The time constant of the filter is chosen so that all alternating voltage components are attenuated. The direct current output voltage is proportional to the synchronizing frequency. In one successful embodiment the filter time constant was .25 second and the highest synchronizing frequency was 25 cycles per second, i. e., a period of .04 second. Therefore, the ratio of time constant to wave period was approximately 6.2 to 1.

In order to properly utilize this direct voltage, it must be brought within the range of the control tube 50, by comparing it with a known reference voltage. The reference voltage, which serves this purpose, consists of a voltage obtained from the secondary voltage of transformer 51, rectified by the selenium rectifier 52. Its peak current is limited by resistor 53.

The reference voltage output is manually adjusted by sweep length potentiometer 54 to produce the desired sweep length and the filtered voltage will then vary so as to stabilize the sweep length. The difference between the filtered and reference voltages is applied to the control grid of tube 50. This causes the desired change in plate voltage of tube 50. Transient grid current in the control tube 50 is limited by resistor 56. To improve circuit stability and reduce the filtering required of capacitors 57 and 46, alternating voltage degeneration is provided by capacitor 59 connected between the plate and grid of control tube 50. The difference between the output voltage of the filter and reference voltage circuit is applied as a grid bias signal to the control tube 50. The resultant variations in the control tube plate voltage produced by the variations in the grid bias signal vary the charging voltage of both the auxiliary and regular sweep voltage generators for the desired sweep length control.

Thus, it can be seen that the reference voltage and filtered sawtooth voltage when used in conjunction with the comparison circuit in the manner described above afford a means of producing a null input to the control tube at the desired stabilized sawtooth amplitude. The nulling action of this combination and circuitry is the same irrespective of widely varying frequencies of generated sawtooth waveforms, and the constant amplitude of horizontal deflection for the cathode ray tube is achieved independently of externally applied synchronizing pulses of variable frequency.

If the sweep should tend to become too long, as would occur with a reduction of sweep frequency, the resulting increase in filter output voltage would tend to drive the grid of control tube 50 to a more positive value. This more positive grid bias on the control tube 50 would cause an increase in its plate current, with a resultant drop in plate voltage which is the sweep charging voltage. Hence, the peak sawtooth voltage and the sweep length which is proportional to it, are reduced.

The auxiliary sweep voltage generator is necessary because the charging voltage of the regular sweep voltage generator is not a linear sawtooth waveform for all variations of sweep frequencies. In order to afford a wider variation of sweep speeds, portions of the main charging capacitance may be disconnected or connected by switch 25. While this arrangement gives a desirable selection of sweep speeds, it also changes the charging rate of the main sweep generator, so that the voltage developed across the main generator charging capacitance is not continuously linear for the entire range of sweep speeds. The auxiliary sweep voltage generator furnishes a source of continuously linear voltage proportional to the sweep period for the entire range of selectable sweep speeds. The auxiliary sweep voltage generator constants and the applied voltages virtually duplicate those of the regular sweep voltage generator when the "slow" sweep is in effect. If only one sweep speed were used the filter could be driven by the main sweep generator. Therefore, the control voltage is unaffected by the "fast" sweep condition. Furthermore, since the sweep voltage generator operates at the same repetition frequency and the same regulated voltages as the auxiliary sweep voltage generator, its charging rate is proportional to the synchronizing frequency. These are important advantages of the present system.

The reference voltage could be supplied by any voltage source such as a battery. The arrangement using the transformer 51 was developed for a particular embodiment. The operation of Fig. 2 is as follows:

The input triggers are applied to the auxiliary sweep tube 40. Therefore, condenser 41 alternately charges and discharges through tube 40. Condenser 41 will charge to a peak value which is a direct function of the voltage of the plate of tube 50, and an inverse function of the frequency of input triggers. The main sweep voltage condenser 20, and therefore the sweep trace is proportional to the same functions. Therefore, the voltage across condenser 41 is proportional to the sweep length. The voltage across condenser 41 is filtered to provide a direct voltage which is compared to a reference voltage, and the difference voltage is applied to the grid of the control tube 50.

For purposes of illustrating the operation in more detail, it may be assumed that the input triggers decrease in frequency from a previous repetition rate. As a result, the voltage across condenser 41 increases, the filtered output voltage increases, and the voltage applied to the grid of tube 50 increases. Therefore, the plate voltage of the tube 50 decreases causing the voltage across condenser 41 to decrease, reversing the variation caused by the decrease in the frequency of the input triggers. If the frequency of the input trigger is increased, the operation of the control would be exactly opposite.

Figure 3:
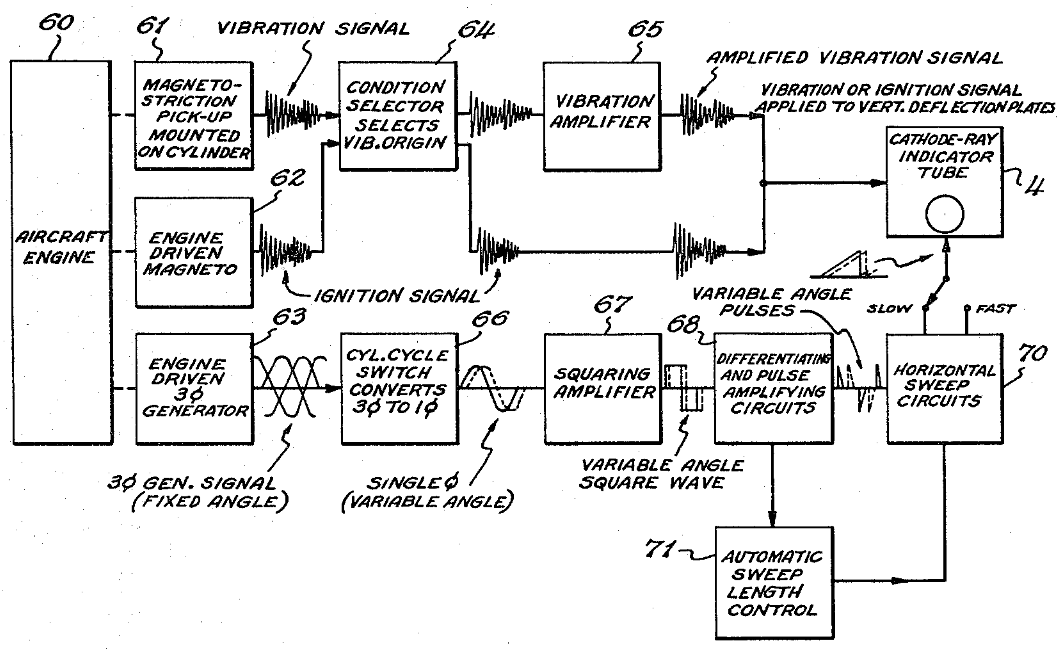
Fig. 3 is a block diagram illustrating an application of the present invention in an engine analyzer.

The block diagram of Fig. 3 shows a typical application of the invention utilized in an engine analyzer. Three signals entering the analyzer from the engine 60 are the vibration signal from pickup 61, the ignition voltage from magneto 62, and 3-phase generator voltages from generator 63. The vibration and ignition signals go into the condition-selector switch 64, where either one or the other is chosen by the operator. If ignition is selected, the signal is passed to the vertical deflection circuit of the cathode-ray tube 4. Since the amplitude of the ignition voltage appearing across the breaker points is sufficient to produce ample deflection when applied directly to the cathode-ray tube, no amplification of the ignition signal is necessary. If the vibration signal is selected, it is passed through the vibration amplifier 65 and then to the cathode-ray tube 4. Amplification is necessary because the normal output of the vibration pickup is only a small fraction of a volt.

The single-phase sine wave is developed by cylinder cycle switch 66, which may be a phase shifter arrangement, and enters a squaring amplifier 67 followed by a differentiating and amplifying circuit 68 which converts the square waves into one positive and one negative pulse for each cycle. The positive pulses are used to trigger the horizontal sweep circuit 70 once each cycle, or once for every two revolutions of the engine. These pulses trigger a conventional sawtooth sweep voltage that is applied to the horizontal circuit of the cathode-ray tube 4. In actual operation the generator 63 is mounted on the engine 60 in such a position relative to the angular position of the tachometer drive shaft that the resulting pulses derived from the cylinder-cycle switch 66 and pulse-forming circuits will trigger the horizontal sweep at exactly the instant the magneto breaker points open to fire, say, the number one cylinder if the cylinder-cycle switch is set to that cylinder. In a like manner, setting the cylinder-cycle switch 66 to any other cylinder will shift the position of the pulse in one direction or the other by the amount necessary to cause initiation of the sweep to occur just as the breaker points open to fire that cylinder.

Having achieved the ability to initiate the sweep just as the desired ignition pattern is beginning to form, the sweep circuit 70 has slow and fast adjustments, so that instead of causing the electron beam merely to move across the tube face once in two revolutions of the engine, it may also move much more rapidly. Thus instead of seeing the ignition patterns for all the cylinders one after another, only the pattern of the cylinder being examined will be visually displayed. The pattern will then be greatly expanded horizontally, thus facilitating analysis. The fast sweep is used mostly for ignition analysis where it is desired to expand the patterns considerably, while the slow sweep is used mainly for vibration analysis where it is more desirable to view the pattern for the entire cycle of cylinder events as one pattern rather than to have it broken up into a number of expanded sections. The slow sweep setting preferably provides a sweep requiring two revolutions of the engine for its completion.

If the sweep speed is maintained constant at either the fast or slow value the length of the horizontal trace will decrease as the engine speed increases. This effect results from the time between initiation of successive sweeps being inversely proportional to engine speed. For example, a 3-inch trace at 1,000 engine R. P. M. would shrink to 1-inch length at 3,000 R. P. M. To remedy this condition the automatic sweep-length control 71 of the present invention is included. In effect this circuit measures the speed of the engine. As the engine speed increases the sweep speed increases correspondingly to maintain the length of the visual patterns constant.

The invention is not limited to sweep circuits since the general system technique as taught in the specification may be used in other voltage control systems without departing from the scope of the invention. The invention is also not limited to the engine analyzer use shown since it may be used whenever a cathode ray indicator may be used.

I claim:

1. A sawtooth voltage generator synchronized by input signals of variable input frequency comprising, first and second capacitors, a single source of unidirectional voltage connected to charge both of said capacitors, first and second means connected to said capacitors and responsive to said input signals to discharge said capacitors, means connected to said second capacitor to produce a voltage proportional to the amplitude of the sawtooth voltage developed across said second capacitor, a reference voltage source, means to compare the amplitudes of said reference voltage and the voltage produced by said last-named means, and means responsive to the resulting difference voltage to control the amplitude of said unidirectional voltage source, whereby the charging rate of said capacitors is proportional to the frequency of said input signals, stabilizing the amplitude of said generated sawtoothed voltage.

2. A sawtooth voltage generator synchronized by input signals of variable frequency comprising, first and second capacitors, a single source of unidirectional voltage connected to charge both of said capacitors, first and second discharge means connected to said capacitors and responsive to said input signals to discharge said capacitors, filter means connected to smooth the sawtooth voltage developed across said second capacitor, a reference voltage source, means to compare the amplitudes of said reference voltage and said filtered voltage, a control vacuum tube connected to said source of unidirectional voltage and responsive to the difference voltage produced by said comparison means to control the amplitude of said unidirectional voltage, whereby the charging rate of said capacitors is proportional to the frequency of said input signals, stabilizing the amplitude of said generated sawtooth voltage.

3. A sawtooth voltage generator synchronized by input signals of variable frequency comprising, a capacitor, a source of unidirectional voltage connected to charge said capacitor, an electron tube connected to said capacitor and responsive to said input signals to discharge said capacitor, filter means connected to filter the sawtooth voltage developed across said capacitor, a reference voltage source, means to compare the amplitude of said reference voltage with said filtered voltage, and means responsive to the difference voltage produced by said comparison means to control the amplitude of said unidirectional voltage source, whereby the charging rate of said capacitor is proportional to the frequency of said input signals, stabilizing the amplitude of said generated sawtooth voltage.

4. A sawtooth voltage generator synchronized by input signals of variable frequency comprising, first and second capacitors, a single source of unidirectional voltage connected to charge both of said capacitors, first and second electron tubes connected to said capacitors and responsive to said input signals to discharge said capacitors, filter means connected to smooth the sawtooth voltage developed across said second capacitor, a reference voltage source, means to compare the amplitudes of said reference voltage and said filtered voltage, and means responsive to the difference voltage produced by said comparison means to control the amplitude of said unidirectional voltage source, whereby the charging rate of said capacitors is proportional to the frequency of said input signals, stabilizing the amplitude of said generated sawtooth voltage.

5. A sawtooth voltage generator synchronized by input signals of variable frequency comprising, first and second capacitors, a single source of unidirectional voltage connected to charge both of said capacitors, first and second discharge means connected to said capacitors and responsive to said input signals to discharge said capacitors, filter means connected to smooth the sawtooth voltage developed across said second capacitor, a reference voltage source, means to selectively tap a determinable amplitude of said reference voltage, means to compare the amplitudes of said selectively determined reference voltage and said filtered voltage, and means responsive to the difference voltage produced by said comparison means to control the amplitude of said unidirectional voltage source, whereby the charging rate of said capacitors is proportional to the frequency of said input signals and the amplitude of said generated sawtooth voltage is stabilized at a value proportional to said selectively determined reference voltage.

6. A sawtooth voltage generator synchronized by input signals of variable frequency comprising, a source of unidirectional voltage, a first group of capacitors, switch means adapted and arranged to selectively connect one or more of said first group of capacitors to said source voltage, an auxiliary capacitor connected to said source voltage, first and auxiliary electron tubes connected to said respective capacitors and responsive to said input signals to discharge said capacitors, filter means connected to smooth the sawtooth voltage developed across said auxiliary capacitor, a reference voltage source, means to compare the amplitudes of said reference voltage and said filtered voltage, and means responsive to the difference voltage produced by said comparison means to control the amplitude of said unidirectional voltage source, whereby the charging rate of said capacitors is proportional to the frequency of said input signals, stabilizing the amplitude of said generated sawtooth voltage in accordance with the selectively connected capacitive value of said first group of capacitors.

7. A sawtooth voltage generator synchronized by input signals of variable input frequency comprising, first and second capacitors, a single source of unidirectional voltage connected to charge both of said capacitors, first and second means connected to said capacitors and responsive to said input signals to discharge said capacitors, means connected to said second capacitor to average the sawtooth voltage developed across said second capacitor, a unidirectional reference voltage, means to compare the average amplitudes of said sawtooth voltage and said reference voltage, and means responsive to the difference voltage produced by said comparison means to control the amplitude of said unidirectional voltage source, whereby the charging rate of said capacitors is proportional to the frequency of said input signals, stabilizing the amplitude of said generated sawtooth voltage.

8. A sawtooth voltage generator synchronized by input signals of variable input frequency comprising, first and second capacitors, a single source of unidirectional voltage connected to charge both of said capacitors, first and second means connected to said capacitors and responsive to said input signals to discharge said capacitors, filter means connected to smooth the sawtooth voltage developed across said second capacitor, a reference voltage including an A. C. voltage source and rectification means connected thereto, means to compare the amplitudes of said filtered voltage and said rectified reference voltage, and means responsive to the difference voltage produced by said comparison means to control the amplitude of said unidirectional voltage source, whereby the charging rate of said capacitors is proportional to the frequency of said input signals, stabilizing the amplitude of said generated sawtooth voltage.

9. In a deflection wave generator adapted to be synchronized by input signals of variable frequency, at least one deflection wave generating capacitor, an auxiliary capacitor, a single source of unidirectional potential, control means having an input and arranged to control the amplitude of said unidirectional potential to produce a controlled unidirectional potential, means for charging each of said capacitors by said controlled unidirectional potential, discharge means adapted to be operated by said synchronizing signals and connected to discharge both of said capacitors upon occurrence of each synchronizing signal, means connected to said auxiliary capacitor for providing a measure of the peak amplitude of the charge repetitively stored on said auxiliary capacitor, means supplying said measure to the input of said control means whereby the maximum amplitude of said deflection wave is stabilized.

10. The combination of claim 9 in which there is a plurality of sweep wave generating capacitors and means for selectively connecting them to the potential source.

11. The combination of claim 9 in which the control means in an electronic discharge device, the input of which is a control electrode and in which the means for providing the measure of said peak charge is a filter circuit.

12. In an engine analyzer, apparatus for providing a sawtooth wave adapted to be synchronized by input signals of variable frequency while providing sawtooth waves of substantially the same value of peak amplitude for various input signal frequencies, said apparatus comprising a sawtooth wave-generating capacitor, a source of unindirectional potential, potential-control means for controlling the magnitude of the output potential of said source and including an input, means for charging said sawtooth wave-generating capacitor by the controlled unidirectional potential, discharge means adapted to be operated by said synchronizing signals and connected to said sawtooth wave-generating capacitor to discharge said capacitor upon the occurrence of the synchronizing signals, means connected to said sawtooth wave-generating capacitor for providing a measure of the peak amplitude of the charge stored on said capacitor, and means for supplying said measure to the input of said potential-control means so as to cause an increase in the output of said potential source and an increase in the charging potential applied to said sawtooth wave-generating capacitor in accordance with decreases in the measure of the peak amplitude of the charge stored on said capacitor, and vice versa, to thereby effect a generation of sawtooth waves of substantially constant peak value independently of the frequency of the synchronizing signals.

References Cited in the file of this patent

UNITED STATES PATENTS

| | | |
|---|---|---|
| 2,125,732 | Manifold et al. | Aug. 2, 1938 |
| 2,266,516 | Russell | Dec. 16, 1941 |
| 2,355,363 | Christaldi | Aug. 8, 1944 |
| 2,360,697 | Lyman | Oct. 17, 1944 |
| 2,480,152 | Mandel | Aug. 30, 1949 |
| 2,492,018 | Sunstein | Dec. 20, 1949 |
| 2,560,585 | McMillan | July 17, 1951 |
| 2,562,188 | Hance | July 31, 1951 |
| 2,615,063 | Brown | Oct. 21, 1952 |
| 2,645,715 | Weller et al. | July 14, 1953 |
| 2,645,751 | Byerlay | July 14, 1953 |